(12) United States Patent
Hsieh et al.

(10) Patent No.: US 12,326,577 B2
(45) Date of Patent: Jun. 10, 2025

(54) HEAD-MOUNTED DISPLAY DEVICE AND ZOOM LENS MODULE

(71) Applicant: HTC Corporation, Taoyuan (TW)

(72) Inventors: Chih-Hsiang Hsieh, Taoyuan (TW); Kuan-Ying Ou, Taoyuan (TW)

(73) Assignee: HTC Corporation, Taoyuan (TW)

( * ) Notice: Subject to any disclaimer, the term of this patent is extended or adjusted under 35 U.S.C. 154(b) by 397 days.

(21) Appl. No.: 18/091,376

(22) Filed: Dec. 30, 2022

(65) Prior Publication Data

US 2024/0219608 A1 Jul. 4, 2024

(51) Int. Cl.
*G02B 3/00* (2006.01)
*G02B 7/02* (2021.01)
*G02B 15/14* (2006.01)

(52) U.S. Cl.
CPC .............. *G02B 3/00* (2013.01); *G02B 7/021* (2013.01); *G02B 15/14* (2013.01); *G02B 2003/0093* (2013.01)

(58) Field of Classification Search
CPC .......... G02B 3/00; G02B 7/021; G02B 15/14; G02B 2003/0093
USPC ......................................................... 359/480
See application file for complete search history.

(56) References Cited

U.S. PATENT DOCUMENTS

2006/0152618 A1* 7/2006 Yamasaki .............. G03B 13/14
  348/E5.025
2020/0371360 A1* 11/2020 Dalrymple ........... G02B 26/004

FOREIGN PATENT DOCUMENTS

| CN | 107577026 | 1/2018 |
|----|-----------|--------|
| CN | 109254405 | 1/2019 |
| CN | 110133851 | 8/2019 |
| CN | 114222520 | 3/2022 |
| CN | 114270228 | 4/2022 |

OTHER PUBLICATIONS

"Notice of allowance of Taiwan Counterpart Application", issued on Sep. 22, 2023, p. 1-p. 4.

* cited by examiner

*Primary Examiner* — Wyatt A Stoffa
*Assistant Examiner* — Mitchell T Oestreich
(74) *Attorney, Agent, or Firm* — JCIPRNET

(57) ABSTRACT

A head-mounted display device and a zoom lens module are provided. The zoom lens module includes a first fixing frame, an arc zoom ring, a second fixing frame, and a first non-circular lens. The first fixing frame has an arc segment and a non-arc segment connected to each other. The arc segment has a slot. The arc zoom ring is disposed on an inner side of the arc segment and capable of sliding in a circumferential direction of the arc segment. An outer side of the arc zoom ring has a slide bar. An inner side of the arc zoom ring has a guide block. The slide bar passes through the slot and is adapted to slide along the slot. The second fixing frame is disposed on an inner side of the first fixing frame and the arc zoom ring and capable of sliding in an axial direction of the arc segment. An outer side of the second fixing frame has a guide rail. The guide block is embedded in the guide rail and adapted to slide along the guide rail. The first non-circular lens is disposed on an inner side of the second fixing frame. The guide block drives the second fixing frame to slide in the axial direction of the arc segment in response to the arc zoom ring sliding in the circumferential direction of the arc segment.

14 Claims, 5 Drawing Sheets

HEAD-MOUNTED DISPLAY DEVICE AND ZOOM LENS MODULE

TECHNICAL FIELD

The application relates to a display device and a lens module, and more particularly, to a head-mounted display device and a zoom lens module.

DESCRIPTION OF RELATED ART

With the rapid advancement of current technology, the types and functions of head-mounted display devices are also increasingly diversified. Taking an eye mask type head-mounted display device as an example, when the user wears such a device, the gyroscope and position tracker inside the head-mounted display device will track the user's movement status to deliver the corresponding scene image, providing the user the experience of being in a virtual world.

When using the head-mounted display device, since the degree of myopia of each user is different, two zoom lens modules are provided in the head-mounted display device to suit different users, so that every user may get the best use experience. Currently, zooming is carried out by rotating a circular zoom ring to drive a circular lens assembled in the zoom ring to move while rotating. However, when the area of the lens is increased to obtain a wider viewing angle, there is a greater probability that the zoom lens module may compress the user's nose. If the part of the zoom lens module close to the user's nose is cut off in order to solve this problem, the zoom ring will not be able to rotate because it is non-circular.

SUMMARY

The application provides a head-mounted display device and a zoom lens module, which may handle the inability of the non-circular zoom ring to zoom.

The head-mounted display device of the application includes a body, a fixture, and two zoom lens modules. The body has two displays corresponding to a pair of eyes. The fixture is adapted to fix the body to a user's head. Each of the zoom lens modules includes a first fixing frame, an arc zoom ring, a second fixing frame, and a first non-circular lens. The first fixing frame has an arc segment and a non-arc segment connected to each other. The arc segment has a slot. The arc zoom ring is disposed on an inner side of the arc segment and capable of sliding in a circumferential direction of the arc segment. An outer side of the arc zoom ring has a slide bar. An inner side of the arc zoom ring has a guide block. The slide bar passes through the slot and is adapted to slide along the slot. The second fixing frame is disposed on an inner side of the first fixing frame and the arc zoom ring and capable of sliding in an axial direction of the arc segment. An outer side of the second fixing frame has a guide rail. The guide block is embedded in the guide rail and adapted to slide along the guide rail. The first non-circular lens is disposed on an inner side of the second fixing frame. The guide block drives the second fixing frame to slide in the axial direction of the arc segment in response to the arc zoom ring sliding in the circumferential direction of the arc segment.

The zoom lens module of the application includes a first fixing frame, an arc zoom ring, a second fixing frame, and a first non-circular lens. The first fixing frame has an arc segment and a non-arc segment connected to each other. The arc segment has a slot. The arc zoom ring is disposed on an inner side of the arc segment and capable of sliding in a circumferential direction of the arc segment. An outer side of the arc zoom ring has a slide bar. An inner side of the arc zoom ring has a guide block. The slide bar passes through the slot and is adapted to slide along the slot. The second fixing frame is disposed on an inner side of the first fixing frame and the arc zoom ring and capable of sliding in an axial direction of the arc segment. An outer side of the second fixing frame has a guide rail. The guide block is embedded in the guide rail and adapted to slide along the guide rail. The first non-circular lens is disposed on an inner side of the second fixing frame. The guide block drives the second fixing frame to slide in the axial direction of the arc segment in response to the arc zoom ring sliding in the circumferential direction of the arc segment.

Based on the above, in the head-mounted display device and the zoom lens module of the application, the non-circular arc zoom ring is used to slide in the circumferential direction to drive the non-circular lens to slide in the axial direction to achieve the purpose of zooming.

DESCRIPTION OF THE EMBODIMENTS

Figure 1:
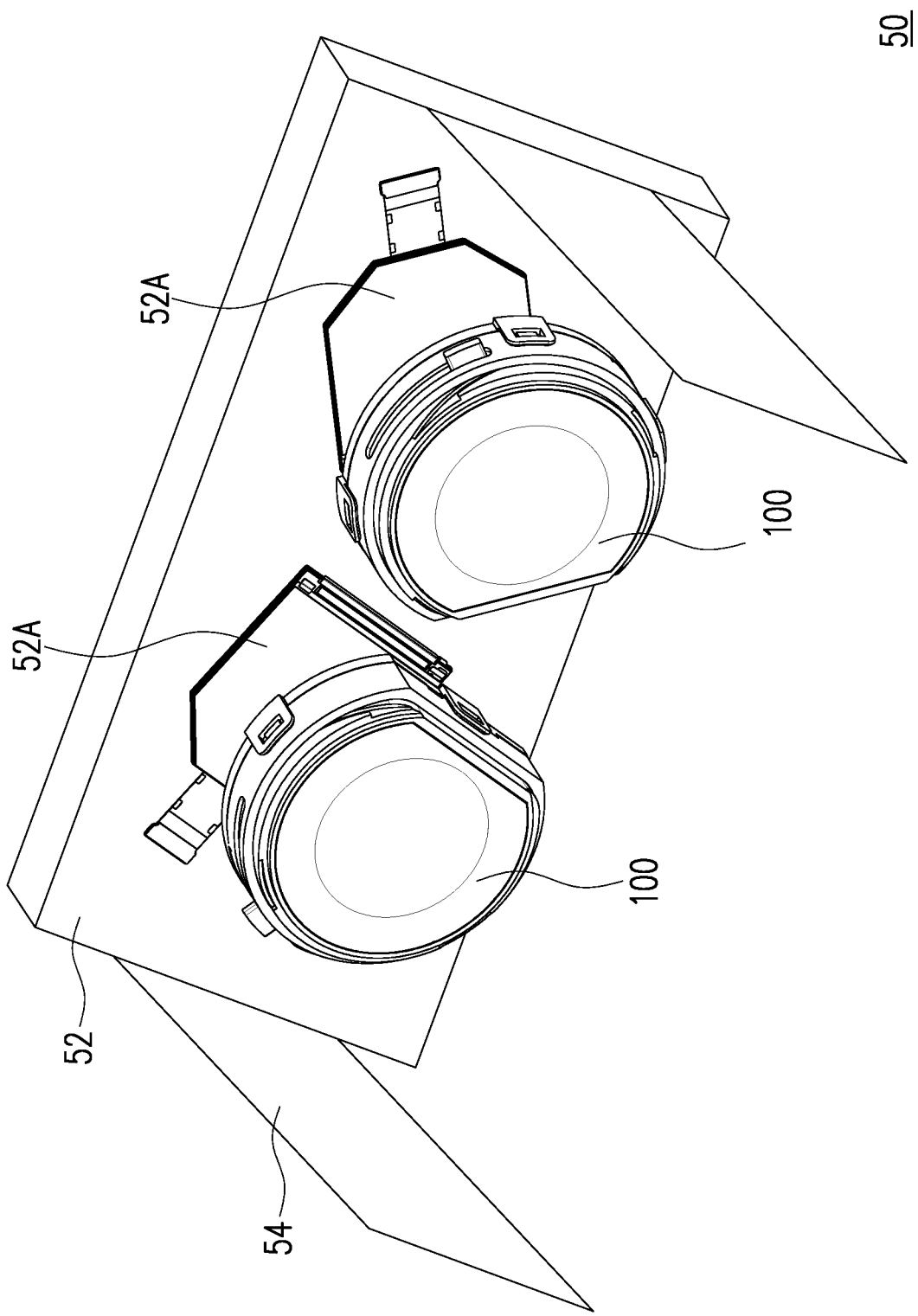
FIG. 1 is a schematic view of a head-mounted display device of an embodiment of the invention.
Figure 2:
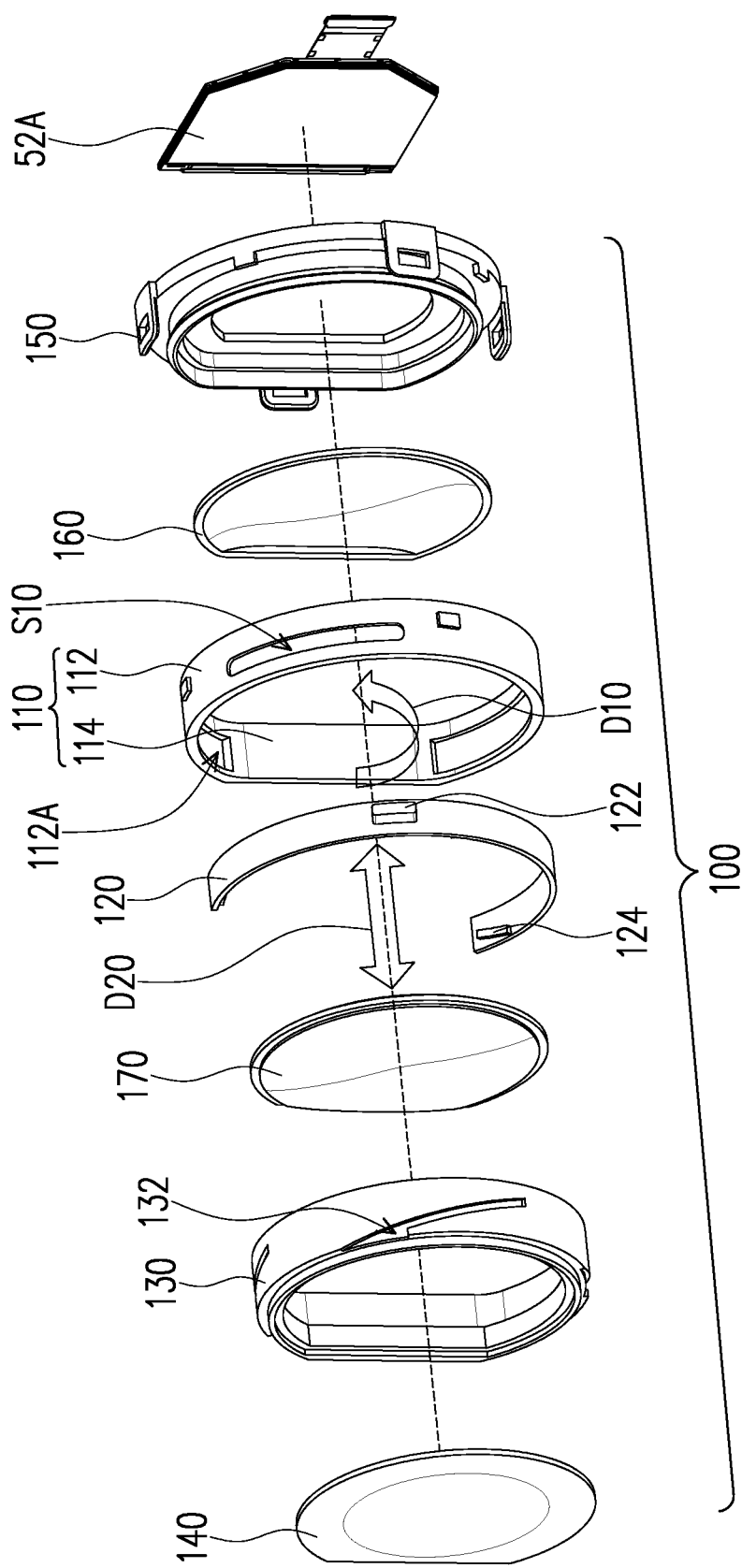
FIG. 2 is a schematic view of the disassembled zoom lens module and display of the head-mounted display device in FIG. 1.

FIG. 1 is a schematic view of a head-mounted display device of an embodiment of the invention. FIG. 2 is a schematic view of the disassembled zoom lens module and display of the head-mounted display device in FIG. 1. Referring to FIG. 1 and FIG. 2, a head-mounted display device 50 of this embodiment includes a body 52, a fixture 54, and two zoom lens modules 100. The body 52 has two displays 52A corresponding to a pair of eyes. The fixture 54 is adapted to fix the body 52 to a user's head. Each of the zoom lens modules 100 includes a first fixing frame 110, an arc zoom ring 120, a second fixing frame 130, and a first non-circular lens 140.

In this embodiment, the host 52 is a head-mounted display, for example, it is applied to fields such as virtual reality system, augmented reality system, or mixed reality system. In addition to the zoom lens module 100, the host 52 may also include other optical systems and components such as outer casing for protection. The fixture 54 of this embodiment is a temple, but the fixture in other embodiments may also be a headband or other fixtures to fix the body 52 on the user's head.

Figure 3:
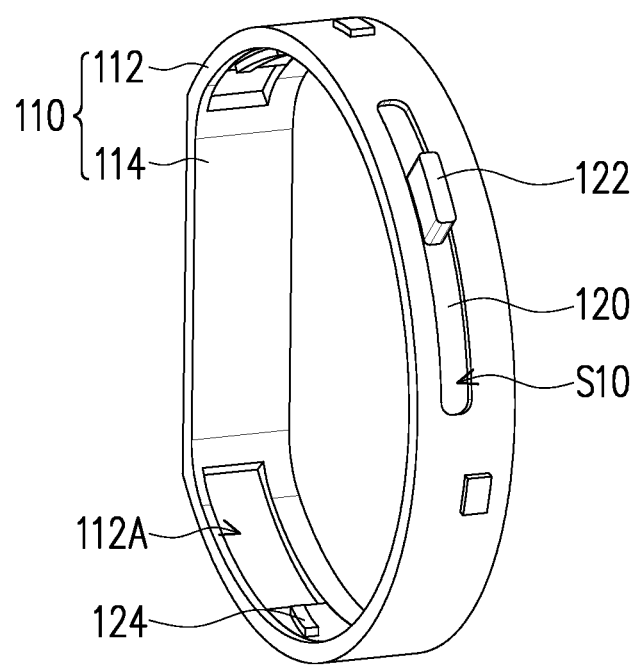
FIG. 3 is a schematic view of the assembled first fixing frame and arc zoom ring in FIG. 2.

FIG. 3 is a schematic view of the assembled first fixing frame and arc zoom ring in FIG. 2. Referring to FIG. 2 and FIG. 3, the first fixing frame 110 has an arc segment 112 and a non-arc segment 114 connected to each other. In this embodiment, two ends of the arc segment 112 are respectively connected to two ends of the non-arc segment 114, so that the first fixing frame 110 is presented as a closed ring. The arc segment 112 has a slot S10. The arc zoom ring 120 is disposed on an inner side of the arc segment 112 and capable of sliding in a circumferential direction D10 of the arc segment 112. That is, the radian of the arc zoom ring 120 is basically consistent with the radian of the arc segment 112. In this embodiment, the length of the arc zoom ring 120 is shorter than the length of the arc segment 112, so that the arc zoom ring 120 is capable of sliding in the circumferential direction D10 of the arc segment 112. An outer side of the arc zoom ring 120 has a slide bar 122. The outer side of the arc zoom ring 120 is the side facing the inner side of the arc segment 112, that is, the inner side of the arc segment 112 is the side facing the outer side of the arc zoom ring 120. In other words, the outer side of the arc zoom ring 120 is adjacent to the inner side of the arc segment 112. An inner side of the arc zoom ring 120 has a guide block 124. The slide bar 122 passes through the slot S10 and is adapted to slide along the slot S10. Thus, the outer side of the arc segment 112 may contact and drive the slide bar 122 to slide along the slot S10, and synchronously drive the arc zoom ring 120 to slide in the circumferential direction D10 of the arc segment 112.

Figure 4:
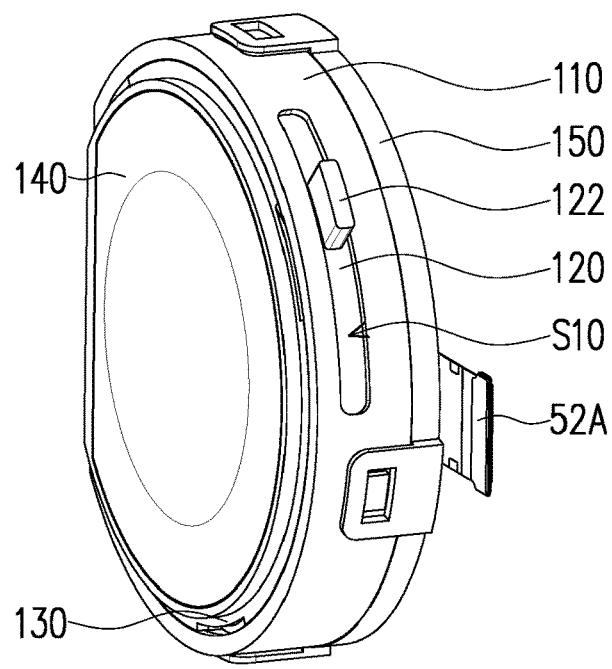
FIG. 4 is schematic view of the assembled zoom lens module and display of the head-mounted display device in FIG. 1.
Figure 5:
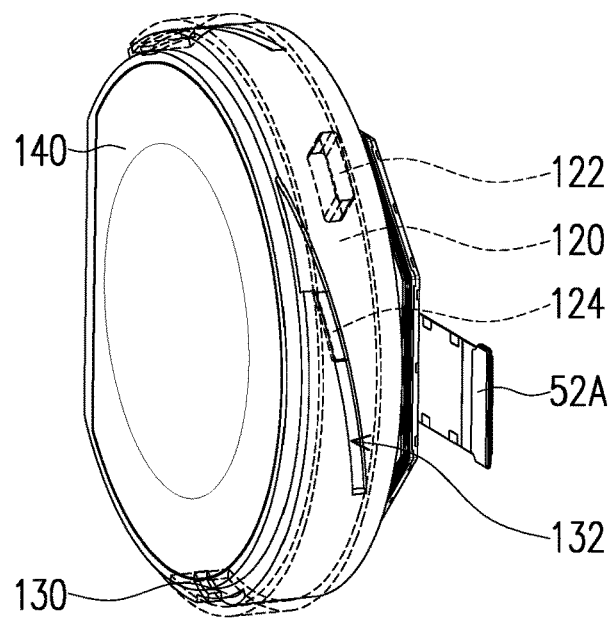
FIG. 5 is a schematic view after removing the third fixing frame in FIG. 4.

FIG. 4 is schematic view of the assembled zoom lens module and display of the head-mounted display device in FIG. 1. FIG. 5 is a schematic view after removing the third fixing frame in FIG. 4. In FIG. 5, the arc zoom ring 120 is shown perspectively, so as to clearly illustrate the bonding of the arc zoom ring 120 and the second fixing frame 130. Referring to FIG. 4 and FIG. 5, the second fixing frame 130 is disposed on an inner side of the first fixing frame 110 and the arc zoom ring 120, and the second fixing frame 130 is capable of sliding in an axial direction D20 of the arc segment 112. In other words, both first fixing frame 110 and the arc zoom ring 120 are located on an outer side of the second fixing frame 130. The outer side of the second fixing frame 130 has a guide rail 132. The guide block 124 is embedded in the guide rail 132 and adapted to slide along the guide rail 132. The outer side of the second fixing frame 130 is the side facing the inner side of the arc zoom ring 120, that is, the inner side of the arc zoom ring 120 is the side facing the outer side of the second fixing frame 130. In other words, the outer side of the second fixing frame 130 is adjacent to the inner side of the arc zoom ring 120. The first non-circular lens 140 is disposed on an inner side of the second fixing frame 130.

Figure 6:
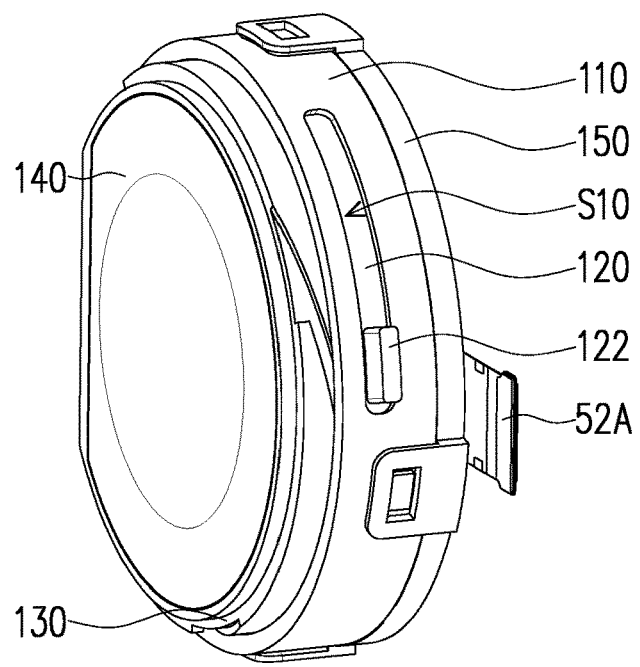
FIG. 6 is a schematic view after radial movement of the first non-circular lens and the second fixing frame in FIG. 4.
Figure 7:
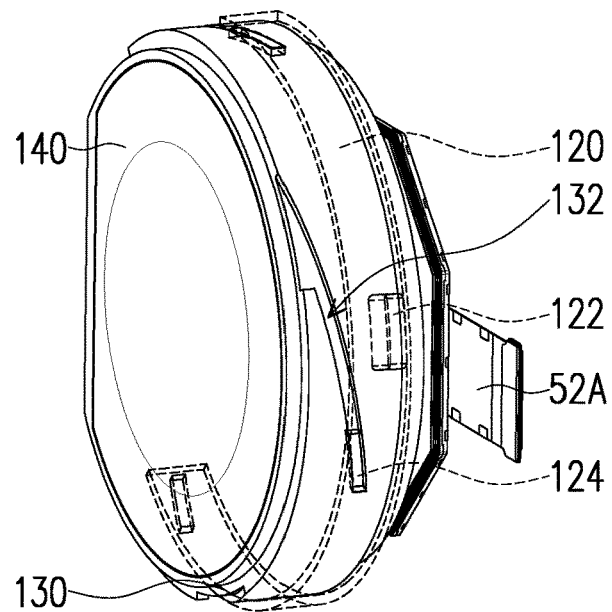
FIG. 7 is a schematic view after removing the third fixing frame in FIG. 6.

FIG. 6 is a schematic view after radial movement of the first non-circular lens and the second fixing frame in FIG. 4. FIG. 7 is a schematic view after removing the third fixing frame in FIG. 6. Referring to FIG. 4 and FIG. 6, in response to the slide bar 122 sliding along the slot S10, since the slot S10 extends along the circumferential direction D10 of the arc segment 112, the arc zoom ring 120 slides only in the circumferential direction D10 of the arc segment 112, and the arc zoom ring 120 does not move in the axial direction D20 of the arc segment 112. However, in addition to extending along the circumferential direction D10 of the arc segment 112, the position of the guide rail 132 in the axial direction D20 of the arc segment 112 also changes gradually. Therefore, in response to the arc zoom ring 120 sliding in the circumferential direction D10 of the arc segment 112, the guide block 124 pushes the wall of the guide rail 132 to drive the second fixing frame 130 to slide in the axial direction D20 of the arc segment 112. That is, as long as the slide bar 122 is contacted and driven to slide along the slot S10, the first non-circular lens 140 disposed on the second fixing frame 130 may slide in the axial direction D20 of the arc segment 112. In this way, the distance between the first non-circular lens 140 and the display 52A is adjusted to achieve the purpose of zooming.

In the head-mounted display device 50 and the zoom lens module 100 of this embodiment, the non-circular first non-circular lens 140 is used to cut a side of the zoom lens module 100 close to the user's nose. The area of the lens is increased, which further increases the viewing angle, and the zoom function is still maintained.

Please refer to FIG. 2 again. In this embodiment, each of the zoom lens modules 100 may further include a third fixing frame 150 and a second non-circular lens 160. The first fixing frame 110 is disposed on an inner side of the third fixing frame 150. An outer side of the first fixing frame 110 is the side facing the inner side of the third fixing frame 150, that is, the inner side of the third fixing frame 150 is the side facing the outer side of the first fixing frame 110. In other words, the outer side of the first fixing frame 110 is adjacent to the inner side of the third fixing frame 150. The second non-circular lens 160 is disposed between the first fixing frame 110 and the third fixing frame 150. In an embodiment not shown, more lenses are also disposed between the first fixing frame 110 and the third fixing frame 150.

In this embodiment, the non-arc segment 114 is linear. The zoom lens module 100 of this embodiment is roughly D-shaped, while the first fixing frame 110, the second fixing frame 130, and the first non-circular lens 140 are also roughly D-shaped, but the application is not limited thereto. Cutaway corners of the two zoom lens modules 100 are opposite to each other, or in other words, the cutaway corners of both zoom lens modules correspond to the user's nose. In addition, the arc zoom ring 120 is roughly C-shaped, but the application is not limited thereto.

In this embodiment, each of the zoom lens modules 100 may further includes a third non-circular lens 170. The third non-circular lens 170 is disposed on the inner side of the second fixing frame 130. In an embodiment not shown, more lenses are also disposed in the second fixing frame 130.

In addition, in the head-mounted display device 50 of this embodiment, the two zoom lens modules 100 may zoom independently. In response to a user having a myopia problem, the zoom lens module 100 is zoomed to obtain a clear image. Moreover, even if the degrees of myopia of the user's eyes are different, the two zoom lens modules 100 is individually zoomed to different degrees, so that the eyes may all obtain clear images.

Please refer to FIG. 3 again. In this embodiment, the inner side of the arc segment 112 has a groove 112A. The arc zoom ring 120 is disposed in the groove 112A and capable of sliding along the groove 112A. The groove 112A may limit the sliding direction of the arc zoom ring 120 to prevent the arc zoom ring 120 from breaking away from the first fixing frame 110.

Please refer to FIG. 5 again. In this embodiment, an amount of the guide block 124 is multiple, and an amount of the guide rail 132 corresponds to the amount of the guide block 124. The amount of the guide rail 132 is a bit more and evenly distributed on the entire second fixing frame 130 as much as possible, so that the sliding of the second fixing frame 130 relative to the first fixing frame 110 is smoother.

To sum up, in the head-mounted display device and the zoom lens module of this application, the zoom ring is arc-shaped and only needs to slide in the circumferential direction of the arc segment of the fixing frame, which means a complete circular zoom ring is not required. Thus, the side of the zoom lens module close to the user's nose is cut, allowing the area of the lens to increase, which further increases the viewing angle while having a zoom function at the same time.

What is claimed is:

1. A head-mounted display device, comprising:
   a body, having two displays corresponding to a pair of eyes;
   a fixture, adapted to fix the body to a user's head;
   two zoom lens modules, assembled to the body and corresponding to the displays respectively, wherein each of the zoom lens modules comprises:
      a first fixing frame, having an arc segment and a non-arc segment connected to each other, wherein the arc segment has a slot;
      an arc zoom ring, disposed on an inner side of the arc segment and capable of sliding in a circumferential direction of the arc segment, wherein an outer side of the arc zoom ring has a slide bar, an inner side of the arc zoom ring has a guide block, and the slide bar passes through the slot and is adapted to slide along the slot;
      a second fixing frame, disposed on an inner side of the first fixing frame and the arc zoom ring and capable of sliding in an axial direction of the arc segment, wherein an outer side of the second fixing frame has a guide rail, and the guide block is embedded in the guide rail and adapted to slide along the guide rail; and
      a first non-circular lens, disposed on an inner side of the second fixing frame, wherein the guide block drives the second fixing frame to slide in the axial direction of the arc segment in response to the arc zoom ring sliding in the circumferential direction of the arc segment.

2. The head-mounted display device according to claim 1, wherein each of the zoom lens modules further comprises a third fixing frame and a second non-circular lens, the first fixing frame is disposed on an inner side of the third fixing frame, and the second non-circular lens is disposed between the first fixing frame and the third fixing frame.

3. The head-mounted display device according to claim 1, wherein each of the zoom lens modules further comprises a third non-circular lens, and the third non-circular lens is disposed on the inner side of the second fixing frame.

4. The head-mounted display device according to claim 1, wherein the non-arc segment is linear.

5. The head-mounted display device according to claim 1, wherein an amount of the guide block is multiple, and an amount of the guide rail corresponds to the amount of the guide block.

6. The head-mounted display device according to claim 1, wherein the inner side of the arc segment has a groove, and the arc zoom ring is disposed in the groove and capable of sliding along the groove.

7. The head-mounted display device according to claim 1, wherein each of the zoom lens modules is D-shaped as a whole.

8. A zoom lens module, comprising:
   a first fixing frame, having an arc segment and a non-arc segment connected to each other, wherein the arc segment has a slot;
   an arc zoom ring, disposed on an inner side of the arc segment and capable of sliding in a circumferential direction of the arc segment, wherein an outer side of the arc zoom ring has a slide bar, an inner side of the arc zoom ring has a guide block, and the slide bar passes through the slot and is adapted to slide along the slot;
   a second fixing frame, disposed on an inner side of the first fixing frame and the arc zoom ring and capable of sliding in an axial direction of the arc segment, wherein an outer side of the second fixing frame has a guide rail, and the guide block is embedded in the guide rail and adapted to slide along the guide rail; and
   a first non-circular lens, disposed on an inner side of the second fixing frame, wherein the guide block drives the second fixing frame to slide in the axial direction of the arc segment in response to the arc zoom ring sliding in the circumferential direction of the arc segment.

9. The zoom lens module according to claim 8, further comprising a third fixing frame and a second non-circular lens, the first fixing frame is disposed on an inner side of the third fixing frame, and the second non-circular lens is disposed between the first fixing frame and the third fixing frame.

10. The zoom lens module according to claim 8, further comprising a third non-circular lens, wherein the third non-circular lens is disposed on the inner side of the second fixing frame.

11. The zoom lens module according to claim 8, wherein the non-arc segment is linear.

12. The zoom lens module according to claim 8, wherein an amount of the guide block is multiple, and an amount of the guide rail corresponds to the amount of the guide block.

13. The zoom lens module according to claim 8, wherein the inner side of the arc segment has a groove, and the arc zoom ring is disposed in the groove and capable of sliding along the groove.

14. The zoom lens module according to claim 8, wherein the zoom lens module is D-shaped as a whole.

* * * * *